United States Patent [19]

Sugisawa et al.

[11] Patent Number: 4,557,939
[45] Date of Patent: Dec. 10, 1985

[54] METHOD FOR IMPROVING A HARDLY SOLUBLE GELLING AGENT

[75] Inventors: Ko Sugisawa, Nara; Masanori Yamamoto, Kaizuka; Masaru Shibuki, Kyoto; Yukihiro Nomura, Nara; Koji Sengoku, Nara; Seiji Higashine, Nara; Hiroko Hioki, Osaka, all of Japan

[73] Assignee: House Food Industrial Co. Ltd., Osaka, Japan

[21] Appl. No.: 621,930

[22] PCT Filed: Oct. 12, 1983

[86] PCT No.: PCT/JP83/00338
§ 371 Date: Jun. 19, 1984
§ 102(e) Date: Jun. 19, 1984

[87] PCT Pub. No.: WO84/01492
PCT Pub. Date: Apr. 26, 1984

[30] Foreign Application Priority Data

Oct. 19, 1982 [JP] Japan ................................ 57-182104

[51] Int. Cl.$^4$ .............................................. A23L 1/04
[52] U.S. Cl. .................................... 426/473; 426/475; 426/476

[58] Field of Search ............... 426/235, 236, 237, 241, 426/242, 573, 576, 575

[56] References Cited

U.S. PATENT DOCUMENTS

| | | | |
|---|---|---|---|
| 2,948,622 | 8/1960 | Cahn | 426/576 |
| 3,494,723 | 2/1970 | Gray | 426/237 |
| 3,620,764 | 11/1971 | Watkins | 426/241 |
| 3,876,373 | 4/1975 | Glyptis | 426/235 |
| 3,904,429 | 9/1975 | Eastman | 426/242 |

FOREIGN PATENT DOCUMENTS

| | | | |
|---|---|---|---|
| 7140745 | 12/1971 | Japan | 426/241 |
| 2042855 | 9/1980 | United Kingdom | 426/241 |

*Primary Examiner*—Jeanette M. Hunter
*Attorney, Agent, or Firm*—Weiss & Holloway

[57] ABSTRACT

The present invention concerns a method for improving the solubility of gelling agents hardly soluble in water such as agar-agar, gelatin and carrageenan. Said method includes the step of contacting said gelling agent with a non-equilibrium plasma formed by applying a high frequency wave to a low pressure gaseous atmosphere, such as air, oxygen, carbon dioxide or nitrogen, and thereby obtaining a gelling agent readily soluble in water.

5 Claims, No Drawings

METHOD FOR IMPROVING A HARDLY SOLUBLE GELLING AGENT

TECHNICAL FIELD

The present invention relates to a method for improving the solubility of a gelling agent hardly soluble in water, more particularly to a method for converting a gelling agent hardly soluble in water to one readily soluble in water.

TECHNICAL BACKGROUND

As hardly soluble gelling agents, gelatin and agar-agar are generally known. For dissolving gelatin in water, first gelatin powder or gelatin sheet must be swollen with water then the mixture of gelatin and water is heated. For dissolving agar-agar in water, on the other hand, the agar-agar must be heated in hot water and the temperature must be maintained at at least 80° C. for a long time.

Under these circumstances, methods have been proposed and/or developed for improving the solubility of gelatin, and the results of the research conducted for this purpose have been reported.

Japanese Patent Publication No. 31,911/1973 and U.S. Pat. No. 3,362,830, for example, disclose methods including steps wherein gelatin powder is first dissolved in water together with an equivalent amount or more of sugars, then the solution thus obtained is dried by means of such methods as spray-drying, etc. On the other hand, Japanese Patent Disclosure No. 162,949/1980 discloses a method wherein water-containing gelatin is heated by use of microwaves to melt and dry it rapidly, then the dried gelatin is frozen and subsequently it is crushed into powder in the frozen condition.

According to the former method, however, a large amount of sugars must be used as the quality-improving agent, and moreover, the resulting gelatin powder is a mixed powder of gelatin and sugars. Therefore it cannot be said that these methods improve the quality of gelatin itself. The latter method, on the other hand, indispensably requires the steps of adding water for forming water-containing gelatin; drying for removing the water content previously added thereto; and crushing this dried gelatin in frozen condition, and thus the method is quite complicated.

On the other hand, no method for improving the solubility of agar-agar has been proposed or developed so far at all.

DISCLOSURE OF THE PRESENT INVENTION

Under such circumstances as set forth above, the inventors of the present invention earnestly carried out research for developing a novel method for improving the solubility of hardly soluble gelling agents including gelatin and agar-agar through very simple processes without additionally using any improving agent such as sugar or the like. And as the result, they have discovered that the solubility of a gelling agent can be effectually improved by use of a non-equilibrium plasma.

The main object of the present invention is to provide a novel method for improving the functional characteristic of gelling agents such as gelatin and agar-agar, that is, a method for converting a gelling agent hardly soluble in water into a readily soluble gelling agent.

Another object of the present invention is to provide a gelling agent readily soluble in water.

These objects and the other object of the present invention can be achieved by contacting the gelling agent with a non-equilibrium plasma.

The method of the present invention includes the steps of applying a high frequency wave irradiated to a low pressure gaseous atmosphere to generate therein a non-equilibrium plasma, and contacting the gelling agent with the non-equilibrium plasma generated in this way.

Generally, a "plasma" is defined as the ionized gaseous condition formed when a substance absorbs an extremely high energy and therey said substance is dissociated into electrified particles. Plasmas can roughly be classified into equilibrium plasmas and non-equilibrium plasmas. An equilibrium plasma is formed by electric discharge such as arc discharge under a relatively high gaseous pressure condition, whereas a non-equilibrium plasma, also called a "low temperature plasma", is generally formed under a low gaseous pressure condition. Accordingly, the temperature of a non-equilibrium plasma is lower than that of an equilibrium plasma. In the present invention, the latter, that is, a non-equilibrium plasma is used.

As the gas to be used for forming the non-equilibrium plasma, there can be used, for example, air and oxygen. However, it is not necessary to limit the gas to these, and any gas will do so long as it causes no problem in view of food sanitation, and such gases as carbon dioxide, nitrogen, etc. may be used.

For forming the non-equilibrium plasma by using a gas such as those mentioned above, a publicly-known low temperature plasma-forming apparatus can be used in the present invention.

BEST MODE FOR PRACTISING THE PRESENT INVENTION

For treating the hardly soluble gelling agent (hereinafter referred to simply as "the gelling agent") with the non-equilibrium plasma, the gelling agent is at first charged into a low temperature plasma-forming apparatus. In this instance, the gelling agent is spread on a tray as a uniform layer, which is then placed in the plasma-forming apparatus, or the gelling agent is place in a plasma-forming apparatus equipped with an agitator. Thus effective contact between the gelling agent and the non-equilibrium plasma can be secured. However, it should be understood that in the present invention, other methods for contacting the gelling agent and the non-equilibrium plasma can be used.

After the gelling agent is charged in the low temperature plasma-forming apparatus, the pressure within the plasma-forming apparatus is reduced to a specific value, and subsequently, a high frequency wave is applied to the low pressure gas within the plasma-forming apparatus. Application of the high frequency wave can be effected during introduction and discharge of a suitable gas.

The pressure within the plasma-forming apparatus is lower than 100 torr, preferably lower than 20 torr.

Whether the non-equilibrium plasma is formed or not can be confirmed by luminescence accompanying formation of plasma.

The length of time for the contact between said non-equilibrium plasma and said gelling agent differs depending on the output of the high frequency wave, the kind of gas used, the degree of pressure decrease, and the type and amount of the gelling agent to be treated, but is sufficient if within 180 minutes, preferably 5-60 minutes.

According to the method of the present invention, the solubility of the gelling agent itself can simply and readily be improved, and the gelling agent thus treated has substantially improved water-solubility as compared with untreated gelling agents.

Hereinafter, we explain the present invention more concretely referring to non-restrictive Examples and comparative tests.

COMPARATIVE TEST 10 g each of agar-agar, gelatin, carrageenan powder were separately placed as thin layers in a low temperature plasma-forming apparatus, whereafter the pressure within said low temperature plasma-forming apparatus was reduced to 0.5 torr. Subsequently high frequency wave of 13.56 MHz at an output 300 W was applied within the apparatus and at the same time oxygen was supplied to the apparatus at the flow rate 50 ml/min. On the other hand, the pressure was maintained at 0.5 torr by means of a vacuum pump and thereby non-equilibrium plasma was formed. Under such conditions, the respective samples as mentioned above were treated respectively for 5, 15, 30, 45, 60 and 180 minutes.

In order to determine the degree of solubility in hot water, the aforementioned 6 groups of samples, and also untreated agar-agar, gelatin and carrageenan powder as comparative samples, were dissolved in hot water and then cooled. The strength of the gel thus obtained was measured according to the method explained below.

A gelling agent such as gelatin forms gel when it is swollen with water, dissolved by heating and then cooled. In other words, the gelling agent does not form gel unless it is dissolved in the water, and the greater quantity dissolved, the higher strength of the gel formed, and this is the reason that we measured the strength of the gel for confirming the solubility of the gelling agent.

(i) Method for Dissolving Gelling Agent (a) Agar-agar

A mixture of a 0.5 sample of agar-agar and 4.5 g sugar powder was put in a beaker. Then 50 ml boiling water was added thereto and said mixture was agitated for 10 seconds. After leaving the mixture at room temperature for 15 minutes, it was cooled to 10° C., and 60 minutes later, the gel strength was measured.

(b) Gelatin

A method similar to that described was carried out except that a 1 g sample of agar-agar and 4 g sugar were used and water of 30° C. was used in place of boiling water.

(c) Carrageenan

A method similar to that described was carried out except that a 1 g sample of carrageenan and 4 g sugar were used and after adding boiling water, the mixture was agitated for 30 seconds.

(ii) Method for Measuring Gel Strength

A plunger having a diameter of 10 mm was put into the gelled material at the speed of 6 cm/min. and the load at the point when the gel collapsed was measured in grams.

The results obtained according to the aforementioned methods are shown in Table 1.

TABLE 1

| Plasma Treatment Time | Gel Strength (g) | | |
|---|---|---|---|
| | Agar-agar | Gelatin | Carrageenan |
| 0 | 54 | 3.9 | 3.2 |
| 5 | 96 | 10.1 | 19.1 |
| 15 | 127 | 10.4 | 23.8 |
| 30 | 147 | 10.4 | 40.3 |
| 45 | 152 | 9.6 | 47.8 |
| 60 | 164 | 8.6 | 54.0 |
| 180 | 141 | 5.8 | 53.3 |

As clearly shown by the numerical values in the column "Gel Strength" in Table 1, the agar-agar and gelatin treated according to the method of the present invention exhibited gel strengths about 2.5-3 times higher than the values of untreated materials, and in case of carrageenan, about 7-18 times higher than untreated materials. This fact shows that the agar-agar, gelatin and carrageenan treated according to the present invention became more readily soluble in water by the degree that the gel strength was increased.

The above tendency was confirmed as well by visual observation. That is to say, when the respective sample solutions obtained in the above comparative test were observed by the naked eye, a large amount of precipitates was observed in the untreated sample solutions, whereas only a very small amount of precipitates was observed in the sample solutions treated according to the method of the present invention, and particularly in case of the respective solutions of gelatin that was treated for 15 minutes and agar-agar and carrageenan that were treated for at least 30 minutes, precipitates could hardly be observed.

Thus, according to the present invention, a hardly soluble gelling agent can be converted into a readily soluble gelling agent without using or adding any improving agent by the simple method of contacting the gelling agent with a non-equilibrium plasma.

EXAMPLE 1

After placing 100 g of agar-agar powder in a thin layer in a tray within a low temperature plasma-forming apparatus, the pressure of said plasma-forming apparatus was reduced to 0.2 torr. Subsequently, microwaves of a frequency of 2450 MHz and a power of 1 Km were applied thereto and at the same time air was supplied to the apparatus at the flow rate 200 ml/min. Thus with the pressure maintained at 0.2 torr by use of a vacuum pump, a non-equilibrium plasma was formed. The agar-agar powder was kept within said plasma-forming apparatus for 15 minutes so as to contact it with the non-equilibrium plasma formed under the above conditions. Then application of microwaves, supply of air and pumping were stopped, and the pressure within said plasma-forming apparatus was restored to normal pressure and the agar-agar powder treated with the non-equilibrium plasma was taken out.

The agar-agar powder thus obtained was found to be improved in solubility to boiling water.

EXAMPLE 2

After placing 100 g of gelatin powder in a thin layer in the tray within a low temperature plasma-forming apparatus, the pressure of said apparatus was reduced to 5 torr. Subsequently, microwaves of a frequency of 2450 MHz were applied at a power of 1 Kw and at the same time air was supplied to the apparatus at the flow rate 200 ml/min. On the other hand, the pressure within the apparatus was maintained at 50 torr by a vacuum pump, and thereby a non-equilibrium plasma was formed. The plasma thus formed and the gelatin powder were kept in contact for 10 minutes. Subsequently the application of microwaves, air supply and vacuum pump were stopped, and after the pressure within the low temperature plasma-forming apparatus had returned to normal, the gelatin powder treated with the non-equilibrium plasma was taken out. To the gelatin powder thus obtained, 45 g sugar was added, and further suitable amounts of a coloring agent, flavoring agent and souring agent and 200 ml of water at 30° C. were added and the mixture was agitated. After agitation, the mixture was poured into a jelly cup and cooled to 5° C. and kept at this temperature for 30 minutes to obtain a jelly.

EXAMPLE 3

After spreading 100 g of carrageenan powder over a tray within a low temperature plasma-forming apparatus, the pressure within the apparatus was reduced to 0.5 torr. Subsequently microwaves of a frequency of 2450 MHz were applied at a power of 1 Kw and at the same time air was supplied at the flow rate 250 ml/min. On the other hand, the pressure within said apparatus was maintained at 0.5 torr by use of a vacuum pump and thereby a non-equilibrium plasma was formed. The plasma thus formed and the carrageenan powder were kept in contact for 15 minutes. Then the application of microwaves, air supply and said vacuum pump were stopped, and after the pressure within the apparatus had returned to normal, the treated carrageenan powder was taken out. To 3 g of the carrageenan powder thus produced, 47 g sugar and suitable amounts of a coloring agent, flavoring agent and souring agent were added, and after thoroughly blending the mixture, 100 ml of boiling water was added thereto and the mixture was agitated, whereafter 100 ml cold water was added and agitation was continued further. Subsequently the mixture thus obtained was poured into a jelly cup, and cooled to 5° C. and maintained at this temperature for 30 minutes to obtain a jelly.

EXAMPLE 4

After placing 100 g of agar-agar powder in a thin layer in a tray within a low temperature plasma-forming apparatus, the pressure within the low temperature plasma-forming apparatus was reduced to 5 torr. Oxygen gas was supplied to the apparatus at the flow rate 50 ml/min and at the same time the pressure within the apparatus was maintained at 5 torr. Subsequently microwaves of a frequency of 2450 MHz were applied at a power of 1 Kw, whereby non-equilibrium plasma was formed. The agar-agar powder was retained within said plasma-forming apparatus for 120 minutes, and it was contacted with said non-equilibrium plasma formed under the aforementioned conditions. Then the application of microwaves, oxygen gas supply and the vacuum pump were stopped, and after the pressure within said low temperature plasma-forming apparatus had returned to normal, the agar-agar powder treated with non-equilibrium plasma was taken out. The agar-agar powder thus obtained was improved to a product excellent in solubility in boiling water.

While the invention has been particularly shown and described in reference to preferred embodiments thereof, it will be understood by those skilled in the art that changes in form and detail may be made therein without departing from the spirit and scope of the invention.

We claim:

1. A method of improving qualities of a hardly soluble gelling agent which comprises contacting said gelling agent for a time period of less than 180 minutes with a non-equilibrium plasma which is generated under a reduced pressure of lower than 100 Torr. in a gas selected from the group consisting of air, nitrogen gas, oxygen gas and carbon dioxide gas by applying a high frequency wave.

2. The method of improving qualities of a hardly soluble gelling agent according to claim 1 wherein said gelling agent is selected from the group consisting of agar-agar, gelatin and carrageenan.

3. The method of improving qualities of a hardly soluble gelling agent according to claim 1 wherein said pressure is lower than about 20 Torr.

4. The method of improving qualities of a hardly soluble gelling agent according to claim 1 wherein said time period is in the range of from about 5 minutes to about 60 minutes.

5. A gelling agent readily soluble in water prepared in accordance with the method of claim 1.

* * * * *